United States Patent
Kim

(10) Patent No.: US 8,701,049 B2
(45) Date of Patent: Apr. 15, 2014

(54) ELECTRONIC DEVICE AND METHOD OF CONTROLLING MODE THEREOF AND MOBILE COMMUNICATION TERMINAL

(75) Inventor: Taehun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 951 days.

(21) Appl. No.: 12/035,299

(22) Filed: Feb. 21, 2008

(65) Prior Publication Data

US 2008/0225014 A1    Sep. 18, 2008

(30) Foreign Application Priority Data

Mar. 15, 2007  (KR) .................. 10-2007-0025577
Mar. 15, 2007  (KR) .................. 10-2007-0025580

(51) Int. Cl.
| | | |
|---|---|---|
| *G06F 3/033* | (2013.01) | |
| *G06F 3/048* | (2013.01) | |
| *G06F 3/041* | (2006.01) | |
| *G09G 5/02* | (2006.01) | |

(52) U.S. Cl.
USPC ........... 715/863; 715/788; 715/800; 345/158; 345/173; 345/698

(58) Field of Classification Search
USPC ........... 715/863, 702, 800; 345/158, 173, 698
See application file for complete search history.

(56) References Cited

U.S. PATENT DOCUMENTS

| | | | | |
|---|---|---|---|---|
| 5,563,996 | A * | 10/1996 | Tchao | 715/201 |
| 7,388,578 | B2 * | 6/2008 | Tao | 345/173 |
| 7,873,622 | B1 * | 1/2011 | Karls et al. | 707/707 |
| 2006/0005131 | A1 | 1/2006 | Tao | |
| 2006/0026521 | A1 | 2/2006 | Hotelling et al. | |
| 2006/0026535 | A1 * | 2/2006 | Hotelling et al. | 715/863 |
| 2006/0097991 | A1 * | 5/2006 | Hotelling et al. | 345/173 |
| 2006/0197753 | A1 | 9/2006 | Hotelling | |
| 2007/0252822 | A1 * | 11/2007 | Kim et al. | 345/173 |

FOREIGN PATENT DOCUMENTS

| | | | |
|---|---|---|---|
| JP | 2003-195998 A | * | 11/2003 |
| JP | 2004-340991 A | | 12/2004 |
| KR | 10-0478920 B1 | | 3/2005 |
| KR | 10-2006-0062962 A | | 6/2006 |

* cited by examiner

*Primary Examiner* — Alvin Tan
*Assistant Examiner* — Rinna Yi
(74) *Attorney, Agent, or Firm* — Birch, Stewart, Kolasch & Birch, LLP

(57) ABSTRACT

A mobile communication terminal, an electronic device, a computer program product, and a method of controlling including receiving a control signal for controlling a predetermined area; and controlling a size and an operating mode of a screen by the control signal. Therefore, various operation modes can be easily selected, and a plurality of touch signals can be recognized and processed.

17 Claims, 16 Drawing Sheets

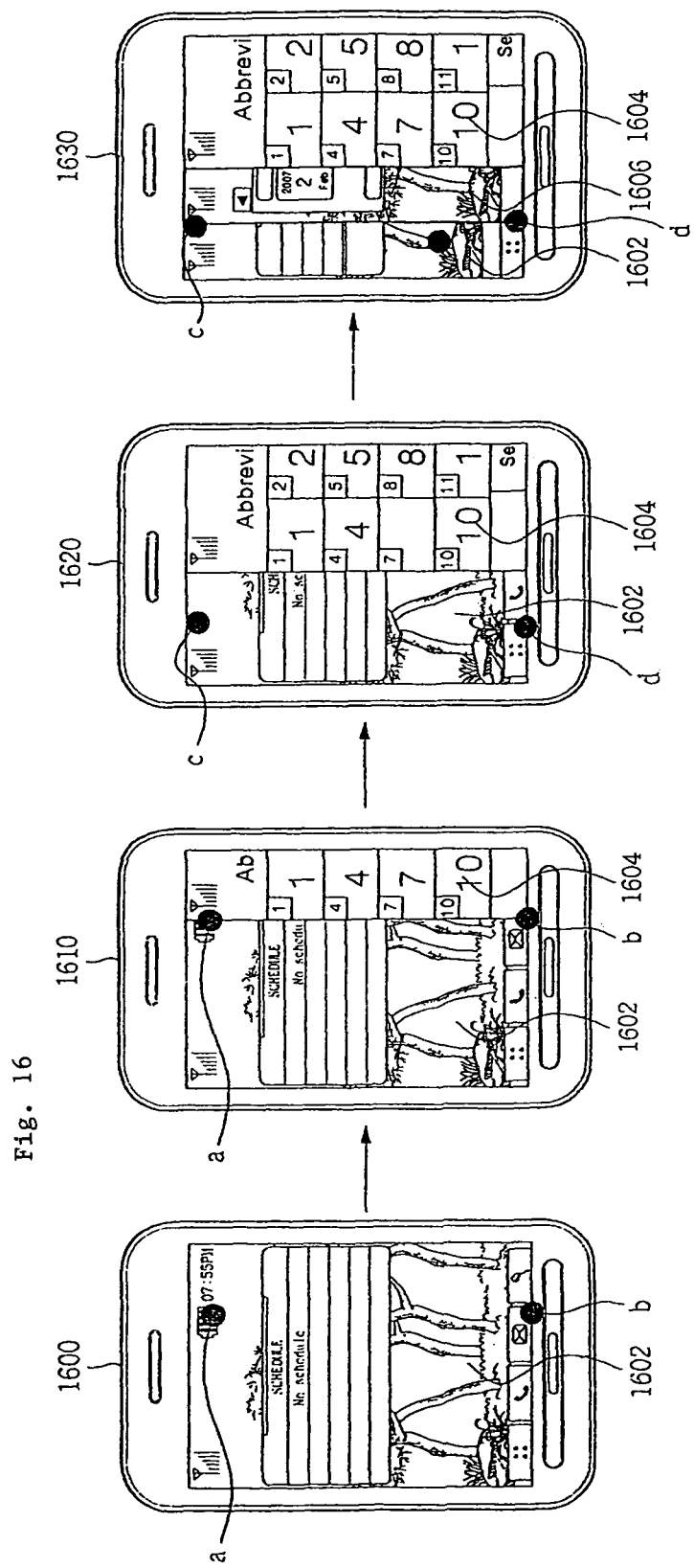

ELECTRONIC DEVICE AND METHOD OF CONTROLLING MODE THEREOF AND MOBILE COMMUNICATION TERMINAL

CROSS REFERENCE TO RELATED APPLICATIONS

This application claims priority under 35 U.S.C. §119(a) on Korean Patent Application Nos. 10-2007-0025577 and 10-2007-0025580, both filed in Republic of Korea on Mar. 15, 2007. The entire contents of each document are hereby incorporated by reference.

BACKGROUND OF THE INVENTION

1. Field of the Invention

This document relates to an electronic device, a method of controlling a mode thereof, a computer program product and a mobile communication terminal.

2. Related Art

Nowadays, portable electronic devices may have various additional functions including a personal information management function such as a phone book, and a scheduler, and a multimedia function such as transmission and reception of a moving picture and an image mail as well as a function as a personal mobile communication appliance.

Due to the many types of additional functions that may be available, a user may have a difficult time navigating between functions. Accordingly, technology for easily selecting and using various additional functions is required.

SUMMARY

In one general aspect, a computer program product and a method of controlling an operating mode of an electronic device, comprising: receiving a control signal for controlling a predetermined area; and controlling a size and an operating mode of a screen by the control signal.

In another aspect, an electronic device comprising: a display unit for displaying a screen; an input unit; and a controller for receiving a control signal from the input unit to control a size and an operating mode of the screen displayed in the display unit by the control signal.

In another aspect, a mobile communication terminal comprising: a radio frequency (RF) module for performing wireless communication; a memory for storing various programs for providing a wireless communication function and an additional function; a display unit for displaying a screen by program execution; an input unit for outputting a control signal by user input; and a controller for controlling a size and an operating mode of a screen displayed in the display unit by the control signal input through the input unit.

In another aspect, a computer program product and a method of controlling input/output comprising: receiving a plurality of touch signals; and controlling a size of a display area by the plurality of touch signals.

In another aspect, an input/output control device comprising: a display unit for displaying a screen; an input unit for outputting a selection signal and a slide signal that are input by a user with a touch signal; and a controller for controlling a size of a display area selected by a plurality of touch signals in the display unit, by the plurality of touch signals that is input through the input unit.

In another aspect, a mobile communication terminal comprising: an RF module for performing wireless communication; a memory for storing various programs for providing a wireless communication function and an additional function; a display unit for displaying a screen by program execution; an input unit for outputting a selection signal and a slide signal input by a user to a touch signal; and a controller for controlling a size of a display area selected by a plurality of touch signals in the display unit, by the plurality of touch signals that is input through the input unit.

Further features will be apparent from the following description, including the drawings, and the claims.

BRIEF DESCRIPTION OF THE DRAWINGS

The details of one or more implementations are set forth in the accompanying drawings and the description below. In the entire description of this document, like reference numerals represent corresponding parts throughout various figures.

FIG. 16 is a diagram illustrating an input/output process of a mobile communication terminal in another implementation.

DETAILED DESCRIPTION

Hereinafter, exemplary implementations will be described in detail with reference to the accompanying drawings.

Figure 1:
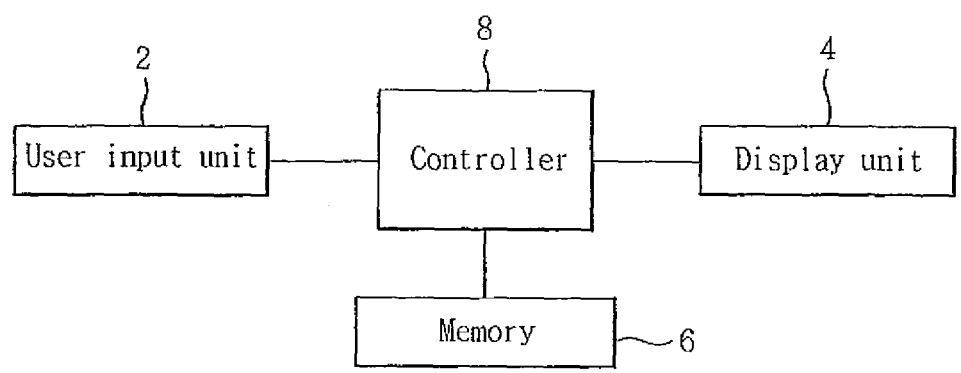
FIG. 1 is a block diagram illustrating a configuration of an electronic device in an implementation.

FIG. 1 is a block diagram illustrating a configuration of an electronic device in an implementation.

As shown in FIG. 1, the electronic device comprises a user input unit 2 for performing user input, a display unit 4 for displaying a screen, a memory 6 for storing programs and data for executing various functions, and a controller 8 for receiving a control signal for selecting a predetermined area of the display unit 4 through the user input unit 2 to control a screen size of the corresponding area and an operating mode of the corresponding screen.

The user input unit 2 can use a key input means such as a keypad, a menu key, a direction key, and a side (or upper and lower) key, and a user input sensor such as a touch sensor, a distance sensor, and a geomagnetic sensor. Further, the user input unit 2 may be embodied in a form of a touch screen using a touch panel for detecting user touch.

The display unit 4 may provide various images such as user input, a menu, and an operating state of the electronic device, and displays a plurality of divided screens according to an operating state of the electronic device. The display unit 4 may use a display device such as a liquid crystal display (LCD), a plasma display panel (PDP), and an organic light emitting diode (OLED).

The controller 8 recognizes an area selected by the user and a slide direction of a user's sliding touch by processing a user control signal that is input through the user input unit 2, enlarges or reduces a size of the area selected by the user in the slide direction according to a recognition result, converts an operating mode of the corresponding area to another operating mode, and displays the converted operating mode in the display unit 4. The controller 8 can display a plurality of divided screens in the display unit 4. Accordingly, the controller 8 controls a size of a screen selected by the user, converts an operating mode of the corresponding screen to a preset operating mode, and controls the display of the corresponding screen.

Conversion of an operating mode of a screen indicates the change of a display state, an operating state, and an input/output attribute of a current screen. For example, as the operating mode of the screen is converted from a phone number display mode to a character message display mode, when information displayed on the screen is changed, a display state on the screen is changed, whereby it is determined that an operating mode is converted.

Further, when a predetermined screen of the user input unit 2 is converted from a character input mode to a numeral input mode using a touch screen method, an input operating state on a touch screen is changed, whereby it is determined that an operating mode is converted.

Further, when a screen is converted from a picture display mode to a memo input mode, an input/output attribute of the touch screen is changed, whereby it is determined that an operating mode is converted.

A conversion order of the converting operating mode is set upon designing a system or is directly set by the user. The conversion order of the operating mode upon designing a system is set to be converted to a mode having correlation according to characteristics of each operating mode, is set to be converted to a mode interlocked to an operating mode of a screen that is not selected, and is set so that operating modes of currently displaying screens to be converted to each other.

Further, according to a control signal that is input while displaying only one screen, the controller 8 executes a preset program, thereby controlling an execution screen of the corresponding program to be displayed at a position in which a touch signal is input, and thus displays both the displaying screen and a screen that is executed by inputting a touch signal with a divided screen.

Figure 2:
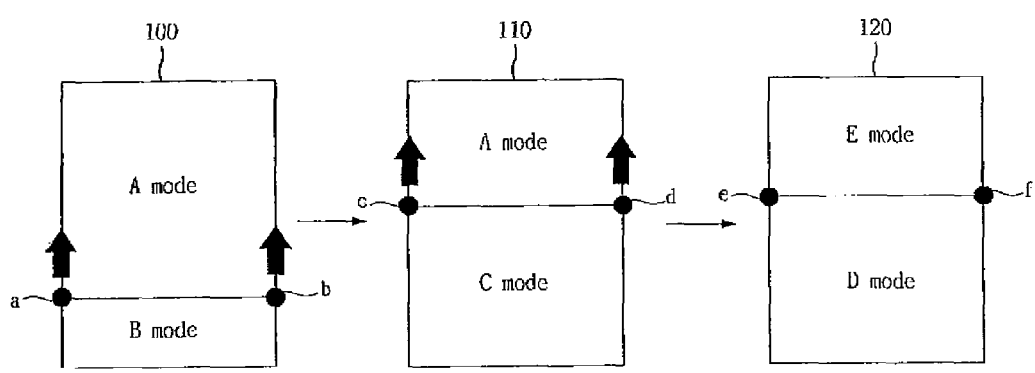
FIG. 2 is a diagram illustrating a converting process of an operating mode of an electronic device in an implementation.

FIG. 2 is a diagram illustrating a converting process of an operating mode of an electronic device in an implementation.

As shown in FIG. 2, on a first display screen 100 in which both an 'A' mode operation screen and a 'B' mode operation screen are displayed, after selecting by touching two points 'a' and 'b' around a border line between an area of the 'A' mode operation screen and an area of the 'B' mode operation screen, the user can input a control signal by sliding two points 'a' and 'b' toward the 'A' mode operation screen. The user can use the side key and the direction key, and upon using the touch panel 12, after selecting by touching the corresponding points 'a' and 'b' of the first display screen 100, the user slides the points 'a' and 'b', thereby inputting a control signal.

If a user control signal is input on the first display screen 100, the controller 8 enlarges an area of the 'B' mode operation screen in a slide direction, converts the 'B' mode operation screen to a 'C' mode operation screen, and displays the 'C' mode operation screen.

Accordingly, as displayed on a second display screen 110, a display state of the first display screen 100 is converted to a state in which both the 'A' mode operation screen and the 'C' mode operation screen are displayed. Here, the 'B' mode and the 'C' mode may be a mode having a functional correlation. For example, when the 'B' mode is a character input mode and the 'C' mode is a numeral input mode, both modes are modes belonging to an input menu, or when the 'D' mode is a picture album viewing mode and the 'C' mode is a moving picture album viewing mode, both modes are modes belonging to an album menu. Further, the 'C' mode operation screen can be converted to an operating mode related to the 'A' mode operation screen that is not selected.

If the user continuously inputs a slide signal at points 'c' and 'd' without stopping sliding on the second display screen 110, a size of a screen area no longer changes, however operating modes of each screen change.

Accordingly, as displayed on a third display screen 120, a border of two screens is fixed at points 'e' and 'f', and operating modes of two screens can be converted to a 'D' mode operation screen and an 'E' mode operation screen.

The previous example is a case of controlling a size and an operating mode of an area using two user control signals. However, in another embodiment, even when one user control signal is input, a size and an operating mode of a selection area can be changed through the same process.

Figure 3:
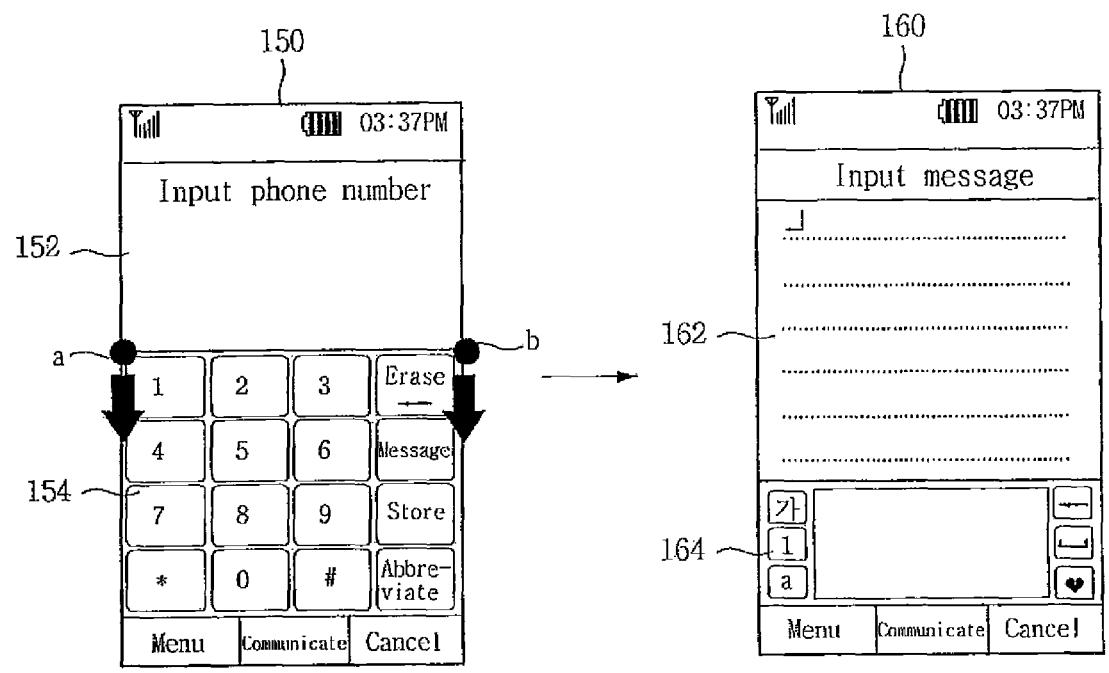
FIG. 3 is a diagram illustrating a converting process of an operating mode of an electronic device in another implementation.

FIG. 3 is a diagram illustrating a converting process of an operating mode of an electronic device in another implementation, and shows a case of receiving a control signal from the user through a touch screen to change a size and an operation state of the screen.

As shown in FIG. 3, both a numeral input screen 154 for inputting a sending phone number and a numeral display screen 152 for displaying a selected sending phone number are displayed on a first touch screen 150.

After selecting by touching two points 'a' and 'b' around a boundary line between the numeral display screen 152 and the numeral input screen 154, the user can input a control signal by sliding the two points 'a' and 'b' toward the numeral input screen 154.

If a user control signal is input on the first touch screen 150, the controller B moves a boundary line between the screens in a slide direction, and converts operating states of the numeral display screen 152 and the numeral input screen 154, thereby displaying a second touch screen 160.

Both a character input screen 164 for inputting a message and a character display screen 162 for displaying the input character are displayed on the second touch screen 160 in which both a size and an operating mode of the screen are converted. Accordingly, both screen sizes and operating modes of a touch screen operating in a different operating mode on the divided screen can be converted through simple touch and slide operation.

Figure 4:
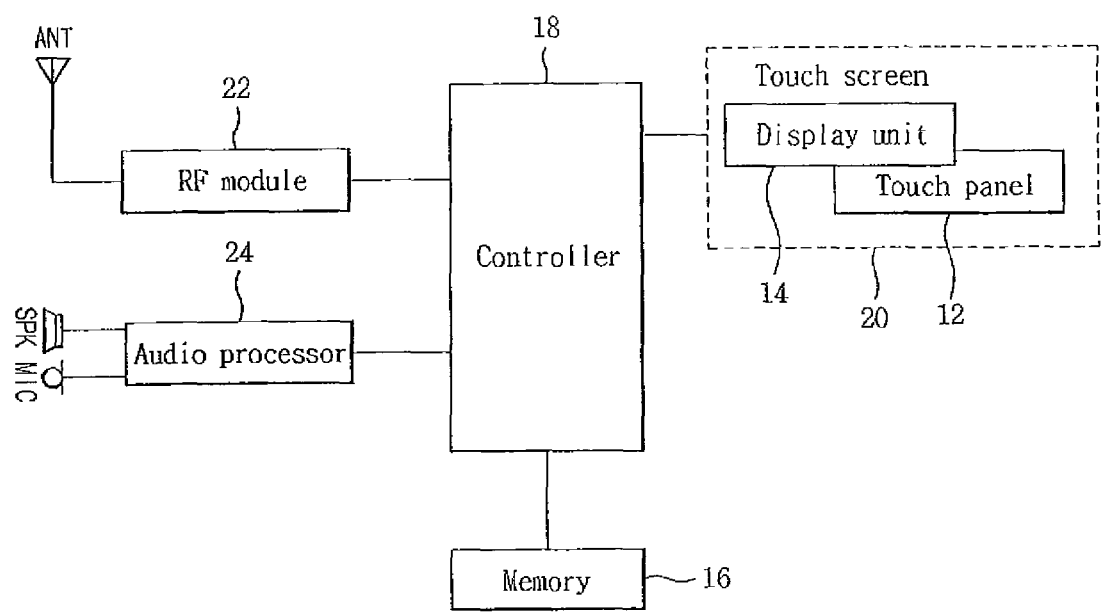
FIG. 4 is a block diagram illustrating a configuration of a mobile communication terminal in an implementation.

FIG. 4 is a block diagram illustrating a configuration of a mobile communication terminal in an implementation.

As shown in FIG. 4, the mobile communication terminal comprises a radio frequency (RF) module 22 for performing wireless transmission and reception, an audio processor 24 for processing an audio signal that is input and output through a microphone MTC and a sneaker SPK, a memory 16 for storing program and user data, a touch screen 20 for performing user input and screen display, and a controller 18 for controlling general functions of the mobile communication terminal.

The touch screen 20 comprises a display unit 14 for displaying data and a touch panel 12, which is a transparent panel having a touch response surface, that is mounted on a visible surface of the display unit 14.

In the display unit 14, user input, a state of the mobile communication terminal, and a processing screen according to execution of a function of the mobile communication terminal are displayed. The display unit 14 can use a display device such as an LCD, PDP, and OLED.

The touch panel 12 detects a touch signal that is input by the user, recognizes a selection position and a selection direction of the touch signal, and provides an input signal such as a control signal and a slide signal to the controller 18. The touch panel 12 can be embodied by using various technology such as a resistance method, a capacitance method, an infrared ray method, a surface acoustic wave (SAW) method, an electromagnetic method, and a Near Field Imaging (NFI) method.

In the memory 16, program data and driving setting data for provided various functions of the mobile communication terminal are stored. Particularly, in an implementation of this document, in the memory 16, setting information of an operating mode that is converted by user selection is stored.

The controller 18 controls general function execution of the mobile communication terminal by executing a program that is stored in the memory 16 by a touch signal that is input through the touch screen 20, and provides generated graphic data to the display unit 14, thereby controlling a text and an image to be displayed on a screen. When a plurality of programs is executed at the same time, the controller 18 controls a screen of the display unit 14 to be displayed with a plurality of divided screens, thereby controlling a screen corresponding to each function to be displayed.

The controller 18 processes a control signal that is input through the touch screen 20 to an area control signal and a slide signal, recognizes a display area of the display unit 14 selected by the user, and enlarges or reduces a size of a display area in a moving direction of the slide signal. Further, the controller 18 controls an operating mode of the selected area to be converted to a different operating mode according to an operating mode setting information that is stored in the memory 16.

In a state where only one screen is displayed in the display unit 14, when a control signal is input, according to operating mode setting information stored in the memory 16, the controller 18 executes an execution program of the corresponding operating mode, controlling a screen of the operating mode to be displayed with a divided screen at a position selected by the user.

Figure 5:
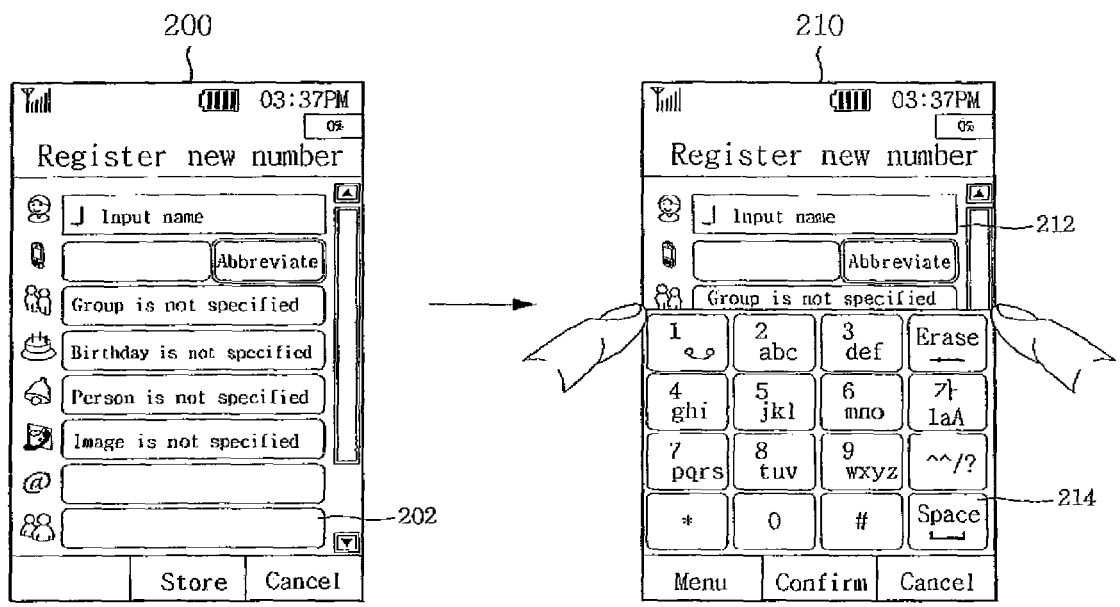
FIG. 5 is a diagram illustrating a converting process of an operating mode of a mobile communication terminal in an implementation.

FIG. 5 is a diagram illustrating a converting process of an operating mode of a mobile communication terminal in an implementation, and shows a case of newly generating and displaying a screen by a control signal that is input by the user.

If a user selects the corresponding function menu in order to register a phone number, a new number registration screen 202 is displayed on the display screen 200 by the control of the controller 18.

If the user selects a predetermined area on the new number registration screen 202, the controller 18 executes a preset function, thereby controlling an operation mode screen for performing the corresponding function to be displayed at a point selected by the user.

Accordingly, upon registering a new number, a keypad input menu necessary for user input is executed, and thus both a new number registration screen 212 and a keypad input screen 214 are displayed on the display screen 210.

Figure 6:
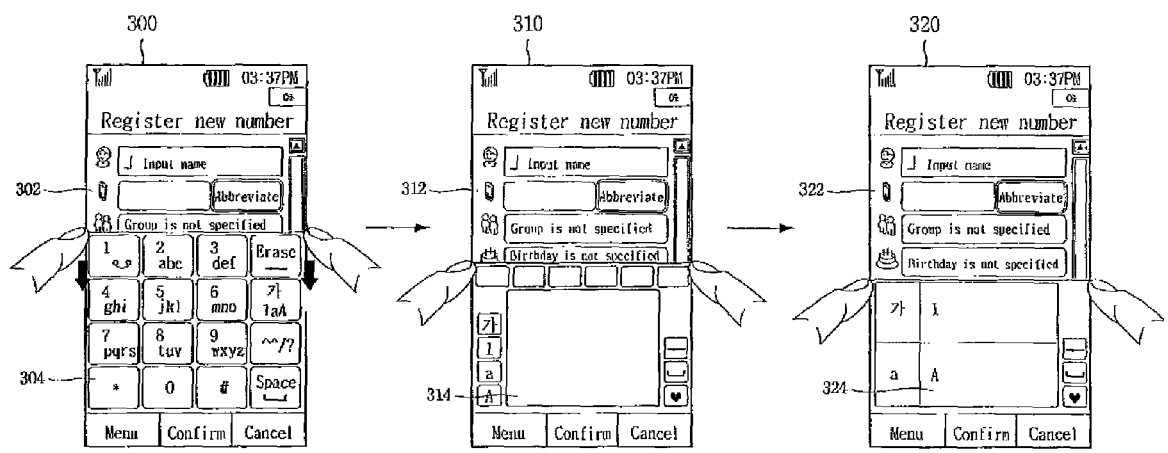
FIG. 6 is a diagram illustrating a converting process of an operating mode of a mobile communication terminal in another implementation.

FIG. 6 is a diagram illustrating a converting process of an operating mode of a mobile communication terminal in another implementation.

Both a new number registration screen 302 and a keypad input screen 304 can be simultaneously displayed on a divided screen on a display screen 300 of the mobile communication terminal in another implementation. The user can select by touching a predetermined point of the keypad input screen 304, and slide the predetermined point in a vertical direction.

If a touch signal is input by the user, the controller 18 controls the keypad input screen 304 to be reduced in a slide direction and the keypad input screen controller 18 can execute a touch input mode, which is an input menu similar to a keypad input mode. Accordingly, a new number registration screen 312 is displayed on the display screen 310, the original keypad input screen 304 is converted to a touch input screen 314, and the touch input screen 314 is displayed. The touch input screen 314 is reduced by a slide signal of the user to be displayed in an area smaller than the keypad input screen 304 that has originally been displayed.

If the user selects by touching and slides a predetermined point of the touch input screen 314, the controller 18 controls to the touch input screen 314 to be converted to another mode screen. The controller 18 can execute a multiple touch input mode, which is an input mode similar to the touch input mode.

Accordingly, a new number registration screen 322 is displayed on the display screen 320, the original touch input screen 314 is converted to a multiple touch input screen 324, and the multiple touch input screen 324 is displayed. The multiple touch input screen 324 can be screen 314 that has been previously displayed in a direction of a slide signal input by the user.

In a state where a screen display area having a converted mode is enlarged to the maximum, if the user continuously inputs a slide signal, a screen size no longer changes and only an operating mode of the corresponding selection area can be changed.

Figure 7:
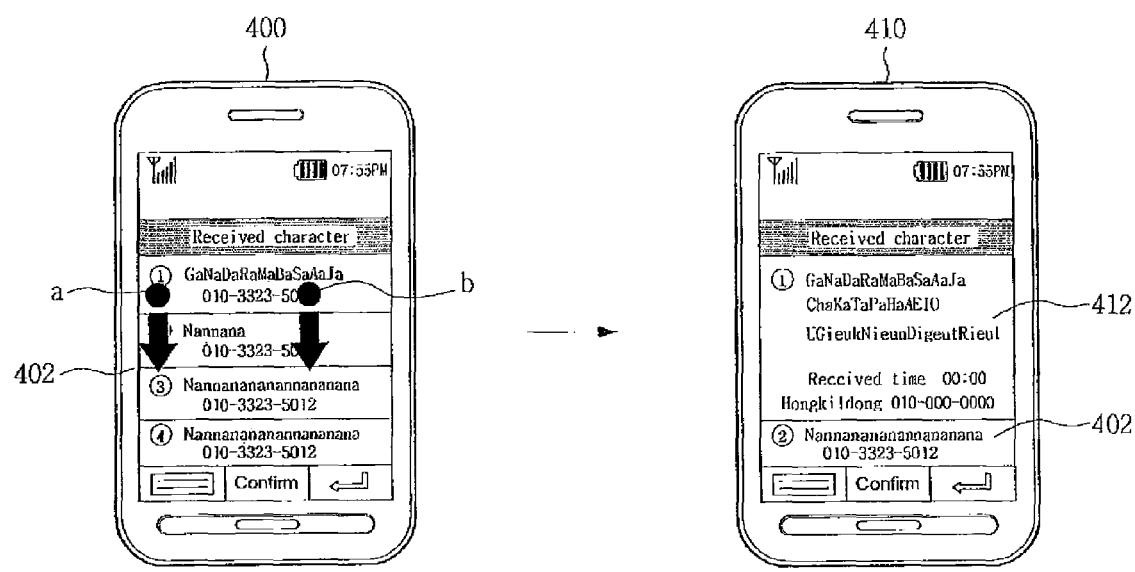
FIG. 7 is a diagram illustrating a converting process of an operating mode of a mobile communication terminal in another implementation.

FIG. 7 is a diagram illustrating a converting process of an operating mode of a mobile communication terminal in another implementation.

A received message list 402 can be displayed on the display screen 400 of the mobile communication terminal in another implementation. A sender or sending number, sending time, and some content of each message are displayed in the received message list 402. When the user selects by touching and slides points 'a' and 'b' of a predetermined message area, the controller 18 enlarges an area of the corresponding message by a user's control signal, and converts an operating mode of the corresponding area from the received message list display mode to a massage content display mode.

Accordingly, the received message list 402 and the message display screen 412 are displayed on the display screen 410, and thus the user can check a desired message content in the received message list 402. Accordingly, other messages displayed in the received message list 402 can be also easily checked.

Figure 8:
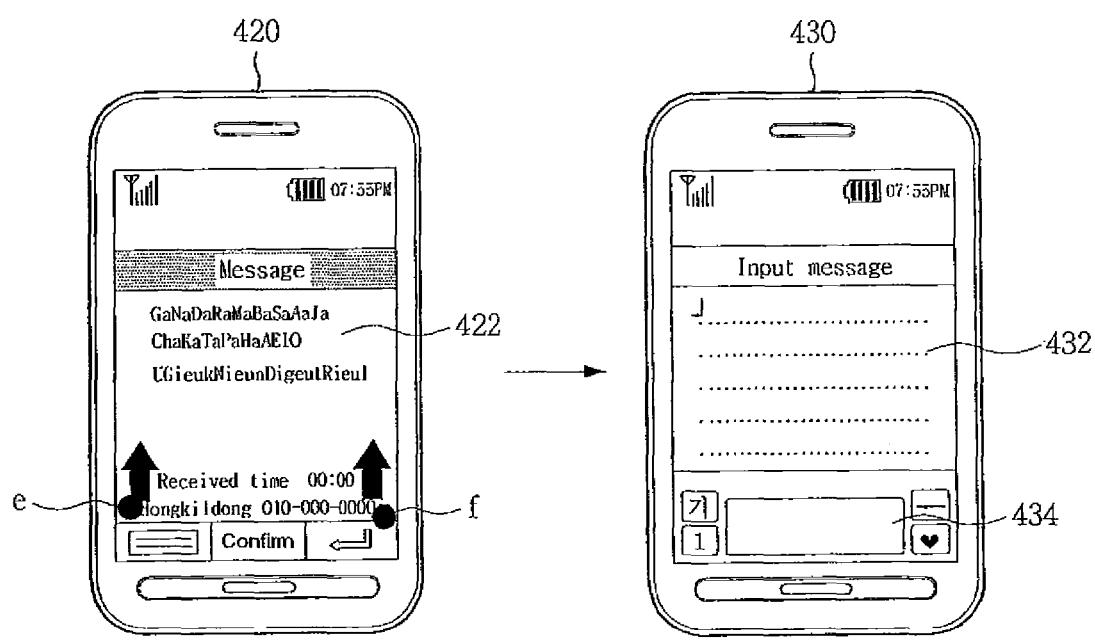
FIG. 8 is a diagram illustrating a converting process of an operating mode of a mobile communication terminal in another implementation.

FIG. 8 is a diagram illustrating a converting process of an operating mode of a mobile communication terminal in another implementation.

As the display screen 420 of the mobile communication terminal in another implementation is operated in a single mode, the display screen 420 displays only a message display screen 422 for displaying a content of the received message.

Here, if the user selects by touching and slides points 'e' and 'f', which are a predetermined point of the message display screen 422, the controller 18 executes a preset function, thereby controlling an operating mode screen for using the corresponding function to be displayed. For example, when a touch signal and a slide signal are input on the message display screen 422, the controller 18 can execute a character message input function for inputting a reply message to send to a sender of a currently displaying message.

Accordingly, both a character input screen 434 for inputting a message and a character display screen 432 for displaying the input character are displayed on the display screen 430, whereby the user can input a reply message to send to another party of the checked message.

Accordingly, various operating modes can be easily selected.

Figure 9:
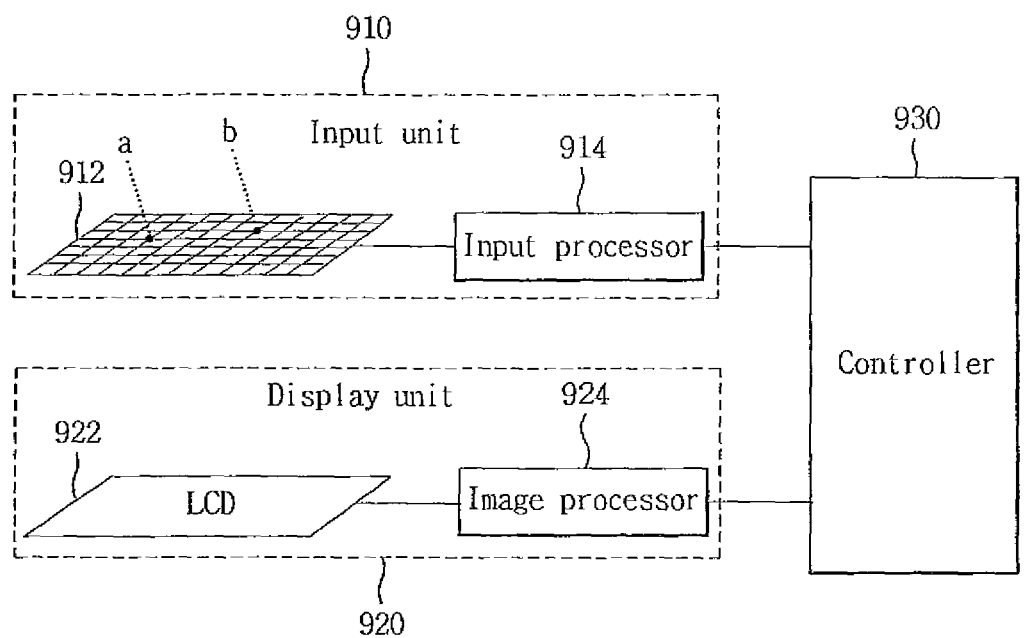
FIG. 9 is a block diagram illustrating a configuration of an input/output control device in another implementation.

FIG. 9 is a block diagram illustrating a configuration of an input/output control device in an implementation.

As shown in FIG. 9, the input/output control device comprises an input unit 910 for processing a touch signal that is input by the user, a display unit 920 for displaying a screen, and a controller 930 for controlling a screen displayed in the display unit 920 according to a plurality of touch signals that is input through the input unit 910.

The input unit 910 comprises a touch panel 912 for detecting user touch and an input processor 914 for recognizing a selection position and a selection direction of a touch signal detected in the touch panel 912 and providing an input signal such as a selection signal and a slide signal to the controller 930.

The touch panel 912 can detect a touch signal selected at a predetermined point such as points 'a' and 'b' and can be embodied using various technology such as a resistance method, a capacitance method, an infrared ray method, a SAW method, an electromagnetic method, and an NFI method.

Further, the touch panel 912 is a transparent panel having a touch response surface and is mounted on a visible surface, for example, an LCD 922 of the display unit 920. A touch signal detected by the input unit 910 comprises a selection signal for selecting a predetermined point and a slide signal having directionality and moving to a predetermined direction. Accordingly, the input processor 914 receives a touch signal from the touch panel 912 and processes information such as an input position and a moving direction of the signal and provides the information to the controller 930.

The display unit 920 comprises an LCD 922 for providing an image and an image processor 924 for converting a data signal provided from the controller 930 to a video signal to be displayed on the LCD 922 and displaying the video signal on the LCD 922. The display unit 920 can use a display device such as an LCD, PDP, and OLED.

The display unit 920 and the input unit 910 have a form of a touch screen for mounting the touch panel 912 on a visible surface of the LCD 922 or are formed in a form of a touch pad in a predetermined area separated from an installation area of the display unit 920, thereby performing an input and output function by the user.

The controller 930 recognizes a display area of the display unit 920 selected by a plurality of touch signals that is input through the input unit 910 and enlarges or reduces a size of a display area in a moving direction of a touch signal.

The controller 930 displays a plurality of divided screens in the display unit 920 and recognizes a selected display area by a plurality of touch signals that is input around a boundary line between the screens. Here, the touch signal comprises a selection signal for selecting a point and a slide signal having directionality and moving to a predetermined direction, and thus the controller 930 controls the display unit 920 so that a boundary line between the screens moves in a slide direction of the slide signal, thereby enlarging or reducing the selected display area.

Further, in an area, not a boundary line between the screens, the controller 930 recognizes the selected display area even in a case where a plurality of touch signals comprising a selection signal and a slide signal is input, thereby enlarging or reducing the display area.

The controller 930 enlarges and displays the displayed information when a display area is enlarged and reduces and displays the displayed information when a display area is reduced.

In an area, not a boundary line between screens, when a predetermined selection signal having no directionality is input, the controller 930 controls an execution screen of the corresponding program to be displayed at a position in which the selection signal is input by executing a preset program, thereby controlling a currently displaying screen and a screen executed by the input of a selection signal to be displayed as a divided screen.

In this way, the input/output processor recognizes that an area is selected by a plurality of touch signals generating in a boundary line between screens, thereby improving a recognition rate of a touch signal.

Figure 10:
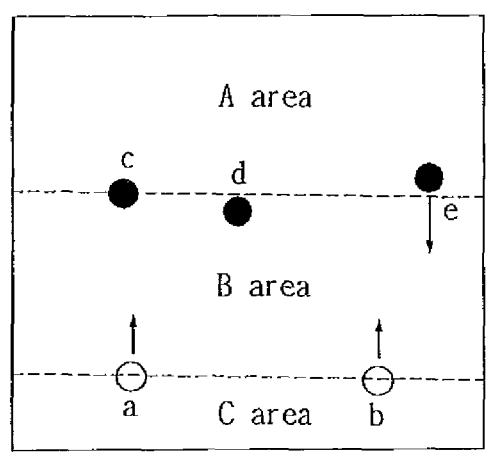
FIG. 10 is a diagram illustrating an input process of an input/output control device in another implementation.
Figure 11:
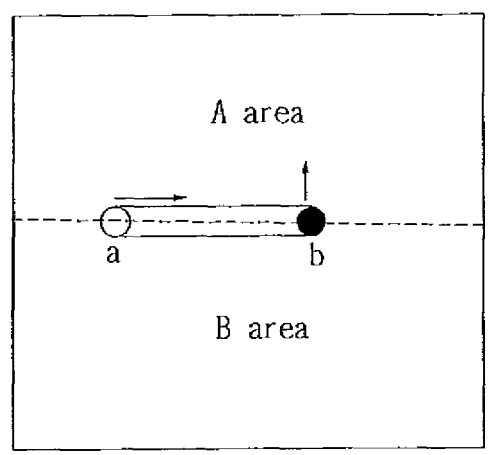
FIG. 11 is a diagram illustrating an input process of an input/output control device in another implementation.
Figure 12:
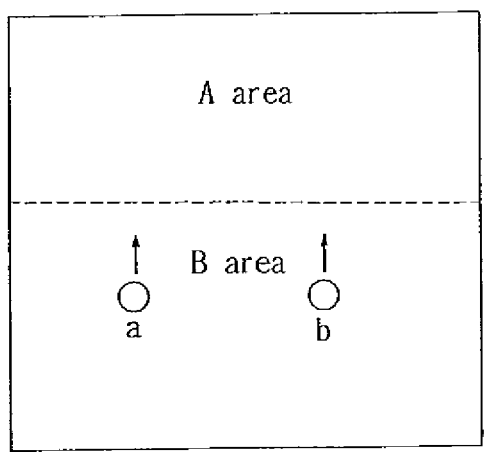
FIG. 12 is a diagram illustrating an input process of FIG. 13 is a flowchart of a method of controlling input/output in another implementation.

FIGS. 10 to 12 show a case of embodying the input/output control device of FIG. 9 in a form of a touch screen, and show a state of providing the touch panel 912 on the LCD 922 of the display unit 920 and controlling a screen by a plurality of touch signals.

FIG. 10 is a diagram illustrating an input process of an input/output control device in an implementation, and shows a case of displaying 3 screens in areas 'A', 'B', and 'C' on a touch screen.

The user selects by touching two points 'a' and 'b' around a boundary line between the areas 'B' and 'C' and slides two points 'a' and 'b' toward the area 'B'.

Accordingly, the controller 930 recognizes that a boundary line between the areas 'B' and 'C' is selected through a position of points 'a' and 'b' to which a touch signal is input and controls a display area of an area 'C' to be enlarged by moving and displaying the boundary line in a slide direction. Touch signals generating at the points 'a' and 'b' can be generated at the same time. That is, if the user selects by simultaneously touching and slides the points 'a' and 'b', the controller 930 moves a boundary line between the selected screens in a slide direction by processing the operations with a signal of controlling a screen size, thereby controlling a display area of the area 'C' to be enlarged and a display area of the area 'B' to be reduced.

Even in a case where a touch signal is not input at the same time, when the corresponding touch signals sequentially generate in an area of a boundary line between the screens, the controller 930 recognizes the selected area, thereby controlling a screen size to be adjusted. For example, the user can sequentially touch points 'c', 'd', and 'e' around a boundary line between the areas 'A' and 'B' and slide only the selected point 'e' toward the area 'B'.

Accordingly, the controller 930 recognizes that a boundary line between the areas 'A' and 'B' is selected through a position of the points 'c', 'd', and 'e' to which a touch signal is input and moves and displays a boundary line in a slide direction at the point 'e', thereby enlarging a display area of the area 'A'.

FIG. 11 is a diagram illustrating an input process of an input/output control device in an implementation, and shows a case of displaying two screens of areas 'A' and 'B' on a touch screen.

The user can select by sliding touching a section from a point 'a' to a point 'b' around a boundary line between the areas 'A' and 'B' and slide the section toward the area 'A'. Accordingly, the controller 930 recognizes that a boundary line between the areas 'A' and 'B' is selected through a position of the sliding section from the point 'a' to the point 'b' and moves and displays a boundary line in a slide direction at the point 'b', thereby enlarging a display area of the area 'B'.

FIG. 12 is a diagram illustrating an input process of an input/output control device in an implementation, and shows a case of displaying two screens of areas 'A' and 'B' on the touch screen.

The user can adjust a size of a display area by selecting a predetermined point of an area to control. In order to controls a size of a display area of the area 'B', the user can select by touching a predetermined point, for example, points 'a' and 'b' within the area 'B' and slides the predetermined point toward the area 'A'.

Accordingly, the controller 930 recognizes that the area 'B' is selected through a position of the points 'a' and 'b' to which a touch signal is input, and moves and displays a boundary line in a slide direction, thereby controlling a display area of the area 'B' to be enlarged. Here, a touch signal generating at the points 'a' and 'b' may be a signal generating at the same time. That is, if the user selects by touching and slides the points 'a' and 'b' at the same time, the controller 930 moves a boundary line between the selected screens in a slide direction by processing the operations with a signal of adjusting a screen size, thereby controlling a display area of the area 'B' to be enlarged and a display area of the are 'A' to be reduced.

Figure 13:
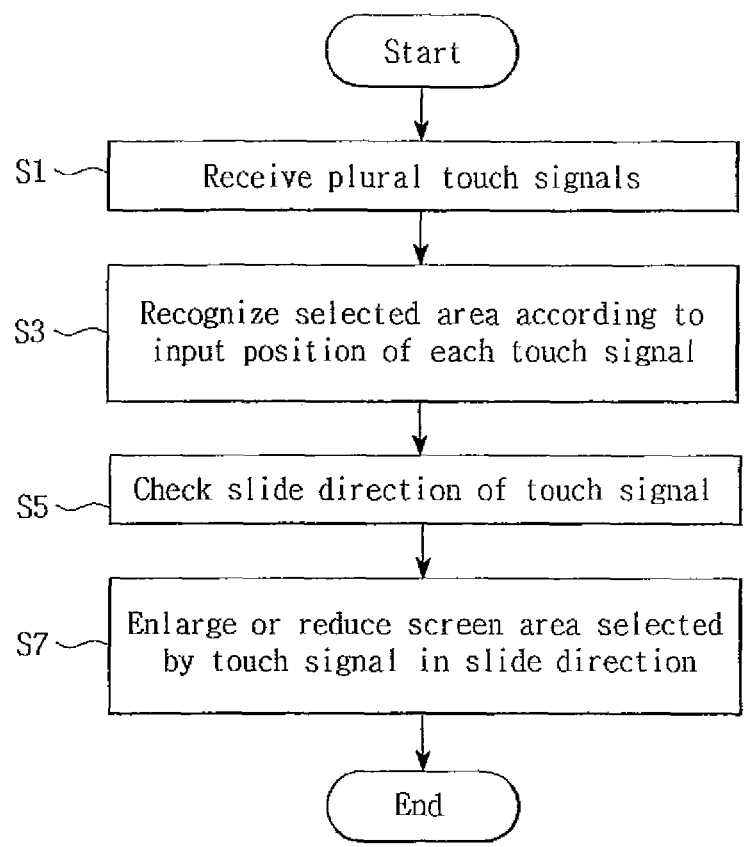

FIG. 13 is a flowchart of a method of controlling input/output in an implementation.

The controller 930 receives a plurality of touch signals selected by the user through the touch panel 912 of the input unit 910 (S1). Here, the plurality of touch signals may be input simultaneously or continuously at different positions. The continuously input touch signal may be input by continuously selecting almost adjacent areas or by sequentially selecting different positions.

The controller 930 recognizes a selected area according to an input position of each touch signal (S3). The controller 930 accurately recognizes an area selected by the user by recognizing a border area between screens at a position adjacent to a plurality of touch signals.

The controller 930 checks a slide direction of a touch signal (S5), and controls the display unit 920 to enlarge or reduce a screen area selected by the touch signal in a slide direction (S7). When a display area is enlarged by a touch signal, the controller 930 controls data displayed in the corresponding area to be enlarged and displayed, when a display area is reduced by a touch signal, the controller 930 controls data displayed in the corresponding area to be reduced and displayed.

As described above, in implementations of this document, a case of recognizing that a border area between screens is selected through input positions of a plurality of touch signals in the display unit 920 in which a plurality of divided screens is displayed and controlling a screen size, is described.

A plurality of touch signals can be generated even in an area in which only one screen is displayed in the display unit 920 or even in an area relatively far apart from a border area between screens. In this case, the controller 930 executes a preset function, thereby controlling a screen of the corresponding function to be displayed with a divided screen at a position selected by the user.

Figure 14:
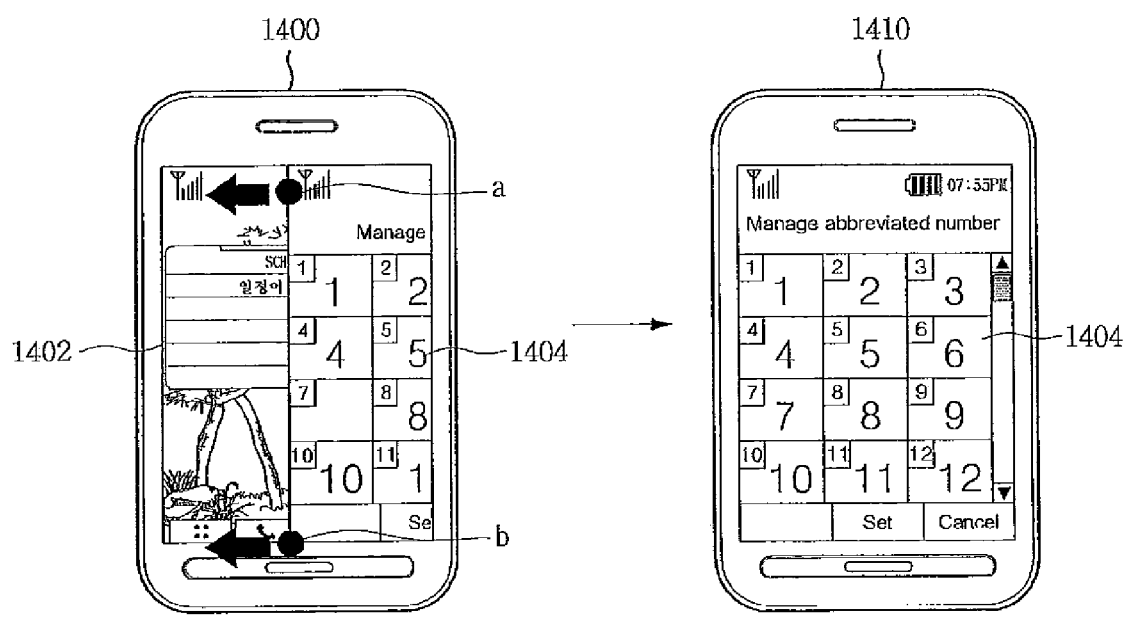
FIG. 14 is a diagram illustrating a display process of a mobile communication terminal in another implementation.

FIG. 14 is a diagram illustrating a display process of a mobile communication terminal in another implementation, and shows a case of displaying divided screens in the display unit 14 by executing a plurality of menus at the same time.

Both a schedule display screen 1402 according to execution of a predetermined function and an abbreviated number management screen 1404 can be displayed on each of divided screens on a display screen 1400 of the mobile communication terminal in another implementation.

In order to use a hidden portion of the abbreviated number management screen 1404, the user can select by touching points 'a' and 'b' around a border between the schedule display screen 1402 and the abbreviated number management screen 1404 and slide the points 'a' and 'b' in a direction enlarging an area of the abbreviated number management screen 1404.

If the user's touch signal is input, the controller 18 recognizes that the points 'a' and 'b' are positioned around a border between the schedule display screen 1402 and the abbreviated number management screen 1404 and enlarges the abbreviated number management screen 1404 in a slide direction, thereby controlling the entire abbreviated number management screen 1404 to be displayed on the display screen 1410.

Here, a touch signal for selecting and sliding the points 'a' and 'b' can be input at the same time or can be input by sequentially inputting the points 'a' and 'b' and sliding only any one of touch signals of the points 'a' and 'b'.

Further, the controller 18 controls an extension distance of a screen to be in proportion to an input distance of a slide signal, thereby providing convenience to the user. For example, if the user selects the points 'a' and 'b', and slides the points 'a' and 'b' up to the end of the display screen 1410 in a horizontal direction, the abbreviated number management screen 1404 is displayed in a full screen on the display screen 1410. When an end point of a slide input stops at a predetermined point, the abbreviated number management screen 1404 can be enlarged only up to a stop point of the slide input.

Figure 15:
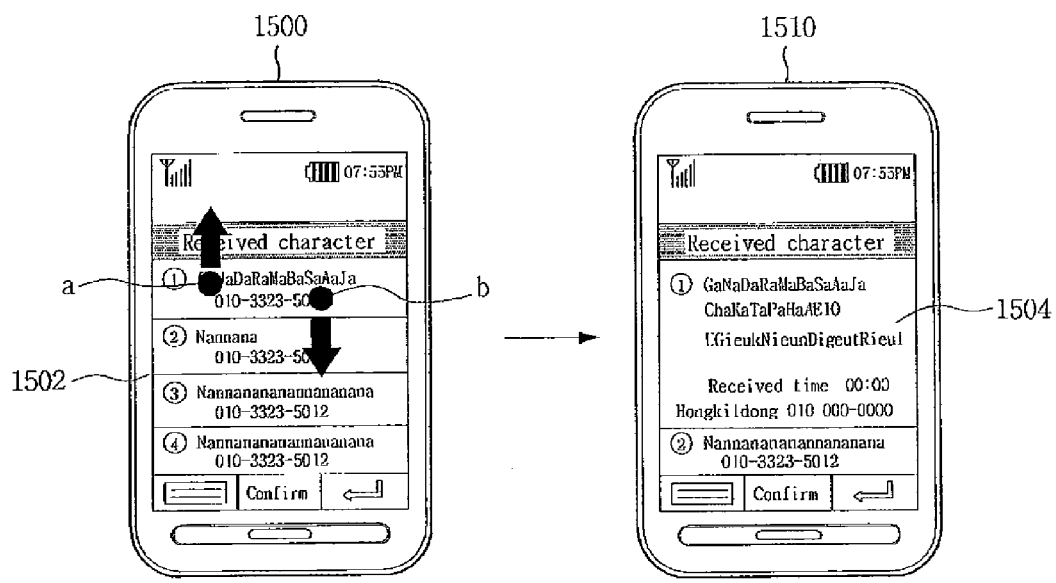
FIG. 15 is a diagram illustrating an input/output process of a mobile communication terminal in another implementation.

FIG. 15 is a diagram illustrating an input/output process of a mobile communication terminal in another implementation, and shows a case of providing data in a list or a table.

The received message list 1502 can be displayed on a display screen 1500 of the mobile communication terminal in another implementation. In the received message list 1502, a sender or a sending phone number, a sending time, and some content of each message are displayed.

In order to check the received message, the user can select by touching points 'a' and 'b' of the corresponding message area of the received message list 1502, and slide the points 'a' and 'b' in a direction enlarging an area of the corresponding message.

Accordingly, the controller 18 recognizes a selected message through a position of the points 'a' and 'b' and displays the received message list 1504 having an enlarged area in a slide direction on the display screen 1510, thereby controlling to check a content of the received message on the received message list 1504.

FIG. 16 is a diagram illustrating an input/output process of a mobile communication terminal in another implementation, and shows a case of newly generating and displaying a screen by a plurality of touch signals that is input by the user.

Only a schedule display screen 1602 is displayed on the display screen 1600 of the mobile communication terminal in another implementation.

If the user touches the points 'a' and 'b' and inputs a selection signal, the controller 18 executes a preset function, thereby controlling a display screen 1610 so that the corresponding function screen is displayed at a point selected by the user. In FIGS. 14 and 16, a case of executing an abbreviated number management function is described, and a case of displaying the abbreviated number management screen 1604 at the points 'a' and 'b' selected by the user is described.

In a state where both the schedule display screen 1602 and the abbreviated number management screen 1604 are simultaneously displayed on the divided screen on a display screen 1620, if the user selects points 'c' and 'd' separated from a border between the schedule display screen 1602 and the abbreviated number management screen 1604 and inputs a touch signal, the controller 18 executes a preset function, thereby controlling a display screen 1630 so that the corresponding function screen is displayed at a point selected by the user. In FIGS. 14 and 16, a case of executing a calendar viewing function is described, and a case of displaying a calendar screen 1606 at the points 'c' and 'd' selected by the user is described.

The device which includes one or more of the previously described embodiments may be a portable cell phone configured to communicate with another cell phone directly or via a base station or related intermediary. As such, the device includes an antenna and a communication input/output device. The device may also be a PDA or another portable terminal device.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

Other features will be apparent from the description and drawings, and from the claims.

What is claimed is:

1. A method of controlling an operating mode of an electronic device having a touch sensitive display screen, the method comprising:
   simultaneously displaying a plurality of areas corresponding to operating modes that are different from each other on the touch sensitive display screen;
   changing a size of a first area and a second area of the plurality of areas without closing the first area or the second area when a user drags a boundary line between the first and the second area via a multi touch drag on the touch sensitive display screen; and
   changing an operating mode of the first area and an operating mode of the second area of the plurality of areas when the multi touch drag on the touch sensitive display screen reaches a predetermined location of the touch sensitive display screen without closing the first area or the second area, the predetermined location being at, or within a predetermined distance from, a center line of the touch sensitive display screen,
   wherein the changing of the operating modes is a conversion of at least one of an operating state and an input/output attribute of a current screen,
   wherein the operating mode of the first area is changed from a first operating mode to a third operating mode,
   wherein the operating mode of the second area is changed from a second operating mode to a fourth operating mode,
   wherein the first operating mode is related to the second operating mode with respect to data input and display within the corresponding areas,
   wherein the third operating mode is related to the fourth operating mode with respect to data input and display within the corresponding areas, and
   wherein the first and second operating modes are voice communication modes for initiating voice communication, and the third and fourth operating modes are texting modes for transmitting text messages.

2. The method of claim 1, wherein the first area corresponds to an area of the plurality of areas adjacent to the boundary line between the first and second area.

3. The method of claim 1, further comprising:
   moving the boundary line between the two areas in a direction corresponding to the dragging.

4. The method of claim 1, wherein the dragging corresponds to simultaneously moving two points in a common direction.

5. The method of claim 1, wherein the dragging corresponds to simultaneously moving two points in opposite directions.

6. The method of claim 5, wherein the dragging corresponds to simultaneously moving the two points toward each other.

7. The method of claim 1, wherein the multi touch drag includes two touches simultaneously inputted at two points on the boundary line between the two areas.

8. The method of claim 1, wherein the step of changing the operating modes causes the step of changing the size of the first area and the second area to stop even if the multi touch drag continues beyond the predetermined location of the touch sensitive display screen.

9. An electronic device, comprising:
   a touch sensitive display screen configured to simultaneously display a plurality of areas corresponding to operating modes that are different from each other; and
   a controller configured to:
   change a size of a first area and a second area of the plurality of areas when a user drags a boundary line between the first and the second area via a multi touch drag on the touch sensitive display screen without closing the first area or the second area, and
   change an operating mode of the first area and an operating mode of the second area of the plurality of areas when the multi touch drag on the touch sensitive display screen reaches a predetermined location of the touch sensitive display screen without closing the first area or the second area, the predetermined location being at, or within a predetermined distance from, a center line of the touch sensitive display screen, wherein the changing of the operating modes is a conversion of at least one of an operating state and an input/output attribute of a current screen, wherein the operating mode of the first area is changed from a first operating mode to a third operating mode, wherein the operating mode of the second area is changed from a second operating mode to a fourth operating mode, wherein the first operating mode is related to the second operating mode with respect to data input and display within the corresponding areas, wherein the third operating mode is related to the fourth operating mode with respect to data input and display within the corresponding areas, and wherein the first and second operating modes are voice communication modes for initiating voice communication, and the third and fourth operating modes are texting modes for transmitting text messages.

10. The electronic device of claim 9, wherein the first area corresponds to an area of the plurality of areas adjacent to the boundary line between the first and second area.

11. The electronic device of claim 10, wherein the multi touch drag includes two touches simultaneously inputted at two points on the boundary line between the two areas.

12. The electronic device of claim 9, wherein the controller is further configured to move the boundary line between the two areas in a direction of the dragging.

13. The electronic device of claim 9, wherein the dragging corresponds to simultaneously moving two points in a common direction.

14. The electronic device of claim 9, wherein the dragging corresponds to simultaneously moving two points in opposite directions.

15. The electronic device of claim 14, wherein the dragging corresponds to simultaneously moving the two points toward each other.

16. The electronic device of claim 9, further comprising:
a communications module configured to wirelessly transmit and receive information.

17. The electronic device of claim 9, wherein the controller is configured to stop changing the size of the first area and the second area even if the multi touch drag continues beyond the predetermined location of the touch sensitive display screen.

* * * * *